(12) United States Patent
Matsushita et al.

(10) Patent No.: US 6,856,359 B2
(45) Date of Patent: Feb. 15, 2005

(54) BIOCHIP WITH MEANS FOR SCANNING LIGHT AND METHOD OF READING THE BIOCHIP

(75) Inventors: Tomohiko Matsushita, Kadoma (JP); Takeo Nishikawa, Minamiibaraki (JP); Shigeru Aoyama, Kyoto (JP)

(73) Assignee: Omron Corporation, Kyoto (JP)

( * ) Notice: Subject to any disclaimer, the term of this patent is extended or adjusted under 35 U.S.C. 154(b) by 95 days.

(21) Appl. No.: 10/422,644

(22) Filed: Apr. 24, 2003

(65) Prior Publication Data

US 2004/0008393 A1 Jan. 15, 2004

(30) Foreign Application Priority Data

Apr. 30, 2002 (JP) .................................... 2002-128552
Apr. 30, 2002 (JP) .................................... 2002-128553

(51) Int. Cl.⁷ .............................................. G02F 1/13
(52) U.S. Cl. .............................................. 349/4; 435/6
(58) Field of Search ................................. 349/4

(56) References Cited

U.S. PATENT DOCUMENTS

| | | | | |
|---|---|---|---|---|
| 6,159,681 A | * | 12/2000 | Zebala | 435/4 |
| 6,403,332 B1 | * | 6/2002 | Bearman et al. | 435/29 |
| 6,630,308 B2 | * | 10/2003 | Stryer et al. | 435/6 |
| 2001/0046673 A1 | * | 11/2001 | French et al. | 435/6 |
| 2002/0146682 A1 | * | 10/2002 | Bearman et al. | 435/4 |
| 2002/0192693 A1 | * | 12/2002 | Pirrung et al. | 435/6 |
| 2003/0036204 A1 | * | 2/2003 | Stark et al. | 436/172 |
| 2003/0219754 A1 | * | 11/2003 | Oleksy et al. | 435/6 |

* cited by examiner

Primary Examiner—James A. Dudek
(74) Attorney, Agent, or Firm—Osha & May L.L.P.

(57) ABSTRACT

A biochip includes a liquid crystal panel having liquid crystal cells each corresponding to each sample on a substrate. The liquid crystal panel includes an upper polarization filter, an upper transparent electrode, an upper orientation film, a liquid crystal, a lower orientation film, a lower transparent electrode and a lower polarization filter in this order. By application of voltage to a desired liquid crystal cell, external light is selectively radiated onto the sample. Thus, it is possible to achieve downsizing, cost reduction and high-speed operation of a biochip reader.

6 Claims, 4 Drawing Sheets

BIOCHIP WITH MEANS FOR SCANNING LIGHT AND METHOD OF READING THE BIOCHIP

BACKGROUND OF THE INVENTION

1. Field of the Invention

The present invention relates to a biochip for analyzing samples such as DNAs, more specifically, a biochip provided with means for scanning light.

2. Description of the Related Art

A biochip (including a DNA chip, a DNA array, a DNA microarray and the like) is a chip in which a plurality of DNA fragments (probes) are arranged densely and immobilized on a substrate such as glass or silicone. When DNAs or RNAs labeled with fluorescence or the like are let to flow on a biochip, these are coupled with probes (hybridization) when these have complementary base sequences to the probes. By reading the labels of the coupled DNAs with using a biochip reader, determination of the gene sequence, confirmation of the presence or absence of a specific gene, and the like are made possible.

However, a conventional biochip reader requires mechanical scanning when radiation of excited light or detection of light emission is to be carried out on individual samples. This raises a problem in that a scanning driver is large and the device as a whole is large and expensive. Further, it is difficult to shorten the scanning time.

SUMMARY OF THE INVENTION

The present invention is made to solve the aforementioned problems, and an object thereof is to achieve downsizing, cost reduction and high-speed operation of a biochip reader.

A biochip according to one embodiment of the present invention includes: a substrate having a plurality of samples; and a liquid crystal panel disposed on a side of the substrate where the samples are not provided and composed of a plurality of liquid crystal cells, wherein the liquid crystal panel includes an upper polarization filter, an upper transparent electrode, an upper orientation film, a liquid crystal, a lower orientation film, a lower transparent electrode, and a lower polarization filter, each of the samples is disposed in correspondence with each of the liquid crystal cells, and external light is selectively radiated onto the samples by application of voltage to the liquid crystal cells.

An optical device according to one embodiment of the present invention includes: a biochip; a light source unit for radiating light onto the biochip; and a light-receiver for receiving light generated from the samples, wherein the biochip includes a substrate having a plurality of samples; and a liquid crystal panel disposed on a side of the substrate where the samples are not provided and composed of a plurality of liquid crystal cells, the liquid crystal panel includes an upper polarization filter, an upper transparent electrode, an upper orientation film, a liquid crystal, a lower orientation film, a lower transparent electrode, and a lower polarization filter, each of the samples is disposed in correspondence with each of the liquid crystal cells, and external light is selectively radiated onto the samples by application of voltage to the liquid crystal cells.

A method of reading a biochip according to one embodiment of the present invention includes the steps of: radiating light from a light source unit onto the samples; and receiving light generated from the samples, wherein light from the light source unit is radiated onto a desired sample by applying voltage selectively to liquid crystal cells corresponding to each of the samples.

DESCRIPTION OF THE PREFERRED EMBODIMENTS

Figure 1:
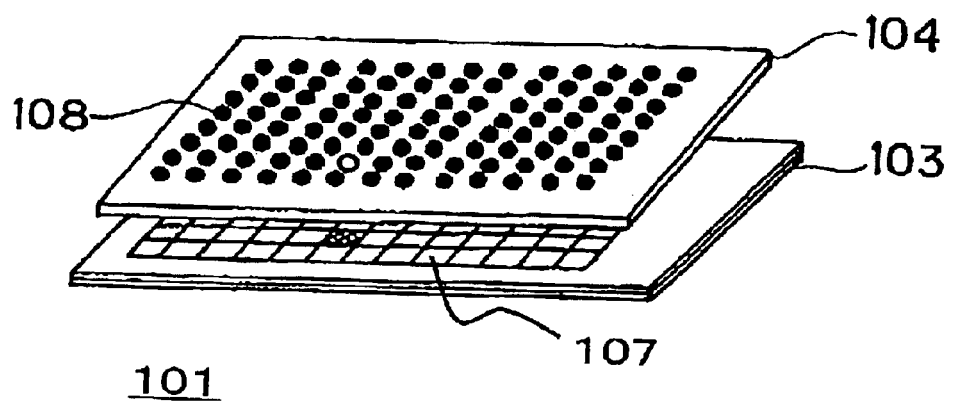
FIG. 1 shows a first embodiment of the present invention.

Hereinafter, preferred embodiments of the present invention will be described illustratively with reference to the accompanying drawings. However, the dimension, material and shape of the constituent elements as well as relative configuration thereof recited in these embodiments are not to be regarded as limiting the scope of the present invention to these unless specifically described.

Further, in the following drawings, the same components with those described in the preceding drawings will be denoted with the same reference numerals.

First Embodiment

As shown in FIG. 1, a biochip 101 according to one embodiment of the present invention includes a substrate 104 provided with samples 108, and a liquid crystal panel 103. The liquid crystal panel 103 is composed of a plurality of liquid crystal cells 107. Each of the samples 108 is disposed in correspondence with each of the liquid crystal cells 107.

The liquid crystal panel 103 includes an upper polarization filter, an upper transparent electrode, an upper orientation film, a liquid crystal, a lower orientation film, a lower transparent electrode and a lower polarization filter in this order. The polarization filters are filters that allow only specific linearly polarized light to pass therethrough, and are arranged so that the polarization direction of the upper polarization filter may be parallel to the polarization direction of the lower polarization filter. The orientation films are thin films for arranging the liquid crystal molecules in a predetermined direction, and have numerous grooves formed in the same direction. When the upper orientation film and the lower orientation film are disposed to face each other so that the directions of the grooves may be perpendicular to each other and liquid crystals are enclosed therein, the liquid crystals are arranged along the orientation films, and are thus in a state of being twisted by 90°. When voltage is applied to the liquid crystals in a twisted state, the liquid crystals will be arranged in order. Light incident into the liquid crystals proceed along the gaps between the arranged molecules.

In the case of such a structure, light does not pass through the liquid crystal panel 103 in a state where no voltage is applied to the liquid crystals. When voltage is applied, the twist of the liquid crystal is released to allow light to pass through the liquid crystal panel 103. The application of voltage can be controlled for each liquid crystal cell 107.

That is, by selective application of voltage to the liquid crystal cells 107, external light is selectively radiated onto the samples 108.

The structure of the liquid crystal panel is not limited to the above-described one as long as it is a structure in which the liquid crystal functions as a light shutter for controlling the passage of light.

Second Embodiment

Figure 2:
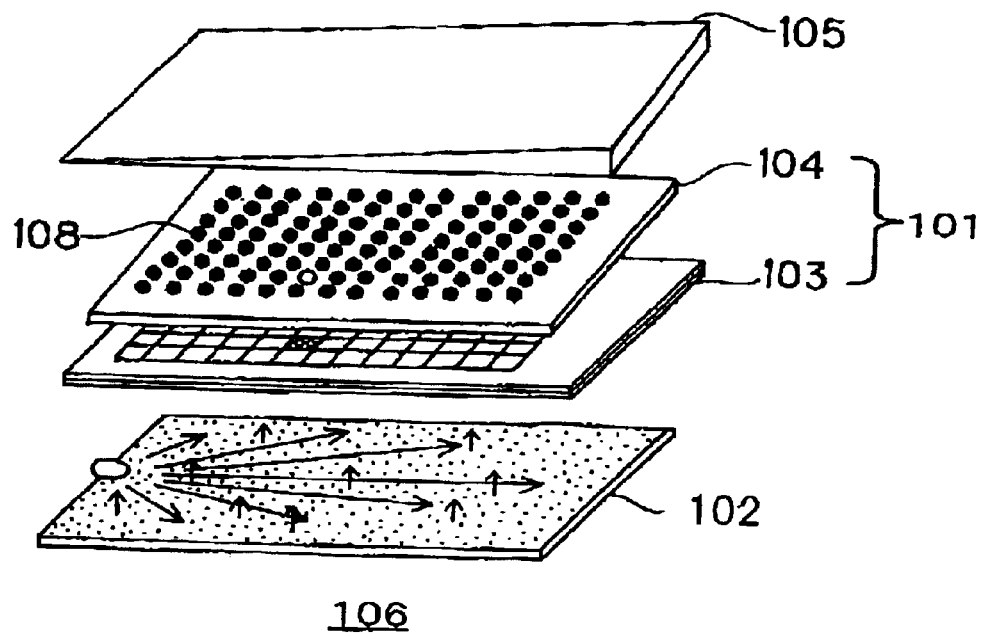
FIG. 2 shows a second embodiment of the present invention.
Figure 3:
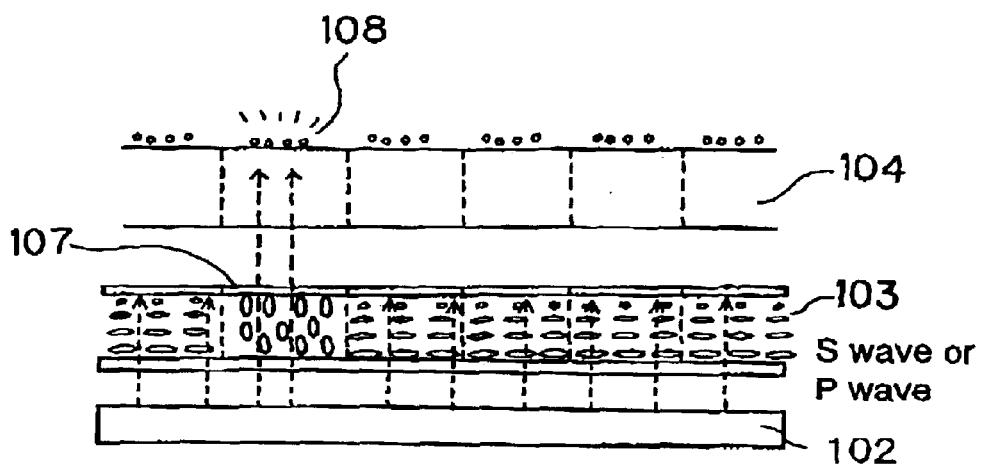
FIG. 3 shows a partially enlarged view of FIG. 2.

As shown in FIG. 2, an optical device 106 according to one embodiment of the present invention includes a biochip 101, a light source unit 102 for radiating light onto the biochip, and a light-receiver 105 for receiving light generated from samples. FIG. 3 shows a partially enlarged view of FIG. 2.

The light source unit 102 may be flat light source unit including a point light source and a light diffusing plate. The number of the point light sources is not limited to one, so that plural point light sources may be provided.

Light emitted from the light source unit 102 will be incident into a liquid crystal panel 103. The light incident into the liquid crystal panel 103 does not pass through the liquid crystal panel 103 in a state where no voltage is applied to the liquid crystal, as described in the first embodiment. However, when voltage is applied to the liquid crystal, the light passes through the liquid crystal panel 103. Therefore, by selective application of voltage to liquid crystal cells 107, external light is selectively radiated onto samples 108.

The samples 108 onto which light has been radiated get excited to generate light such as fluorescence. The light generated from the samples 108 is received by the light-receiver 105.

Thus, this embodiment eliminates the need for mechanical scanning, since the light radiated onto the samples 108 is controlled by the liquid crystal panel 103. This prevents the device as a whole from being large due to the presence of the scanner. Further, since no mechanical operation is involved, the measurement precision is kept in time series. Furthermore, light scanning using a liquid crystal panel can be carried out in a short time and at a low consumption power.

Third Embodiment

Figure 4:
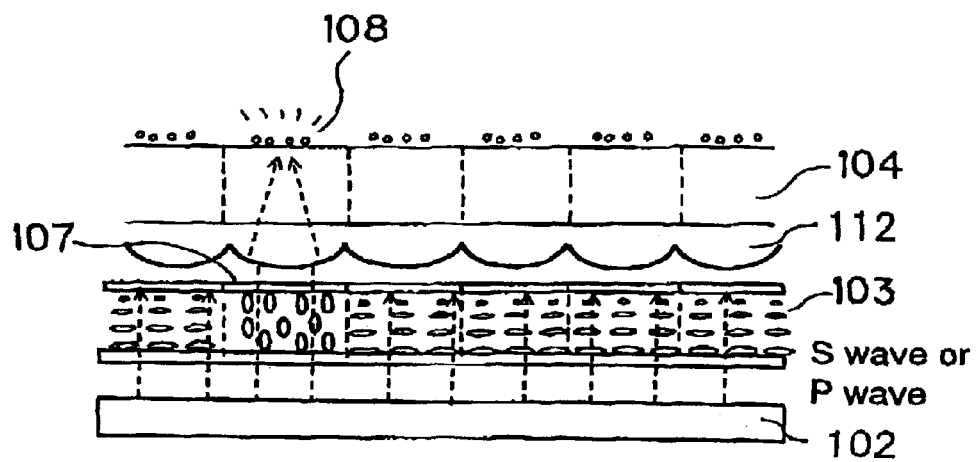
FIG. 4 shows a third embodiment of the present invention.

As shown in FIG. 4, an optical device according to one embodiment of the present invention includes a microlens array 112 disposed between a liquid crystal panel 103 and a substrate 104. The microlens array 112 includes micro lens each of which has one-to-one correspondence to each of samples 108 on the substrate 104.

Therefore, by the light-collecting function of the microlens array 112, the light from a light source unit can be efficiently radiated onto the samples 108. The shape of the lens sections of the microlens array 112 may be a curved surface or may be prismatic.

Fourth Embodiment

Figure 5:
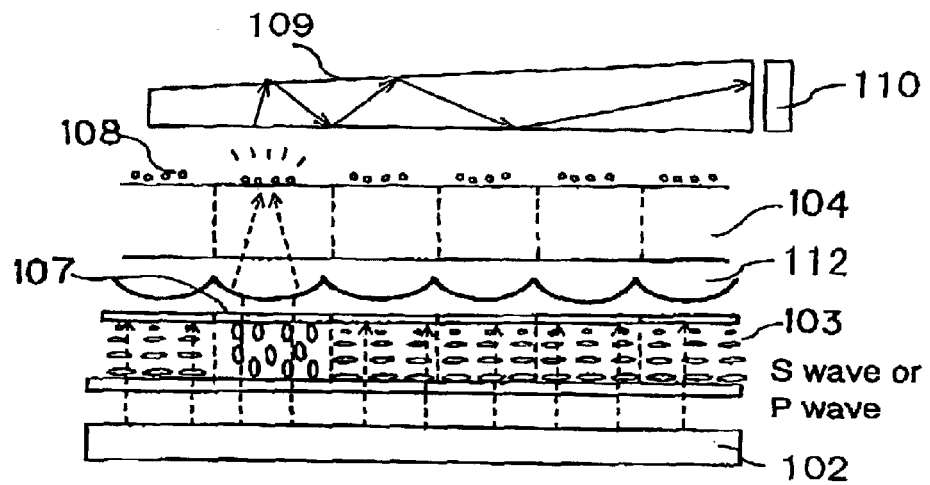
FIG. 5 shows a fourth embodiment of the present invention.

As shown in FIG. 5, a light-receiver 105 of an optical device according to one embodiment of the present invention includes a light guiding part 109 and a measuring part 110. Light such as fluorescence generated from samples 108 is guided by the light guiding part 109 and received by the measuring part 110 composed of a photodiode or the like.

The light guiding part 109 may have a rectangular shape or a wedge shape. Further, the surface of the light guiding part 109 maybe provided with a plurality of patterns. The light incident into the light guiding part 109 is reflected by the patterns to be directed to the measuring part 110. By controlling the normal direction of the patterns, the light generated from the samples 108 can be efficiently guided into the measuring part 110.

By the way, in the measuring part 110, simultaneously with the light generated from the samples 108, the light from a light source unit 102 which is radiated onto the samples 108 may possibly be measured as well. In such a case, the S/N ratio may decrease. In order to prevent this decrease, the light generated from the samples 108 may be measured after the radiation of light from the light source unit 102 is stopped.

Fifth Embodiment

Figure 6:
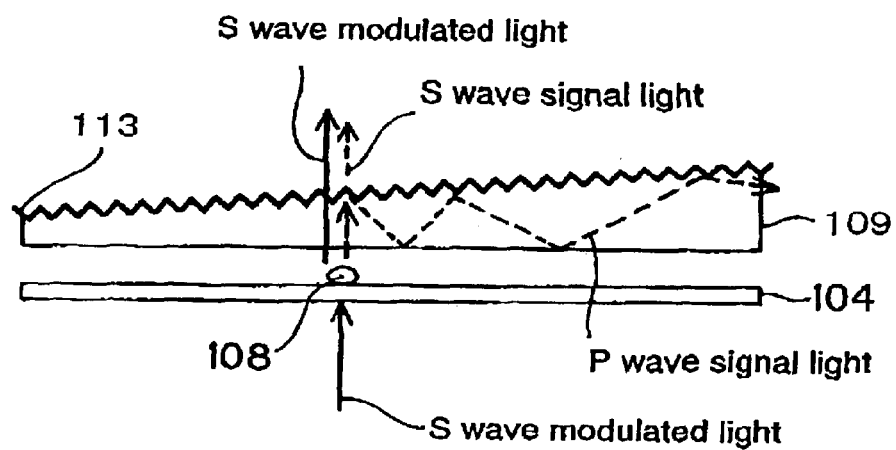
FIG. 6 shows a fifth embodiment of the present invention.

As shown in FIG. 6, an optical device according to one embodiment of the present invention includes a Bragg grating pattern 113 disposed on a side of a light guiding part 109 opposite to a substrate 104. The Bragg grating pattern 113 has a property of transmitting at least a part of S wave or P wave and reflecting the other one.

Modulated light which is modulated into S wave, for example, is radiated onto samples 108. The modulated light refers to light that has undergone some modulating action such as polarization conversion among the reference light emitted from a light source unit. The light emitted from the samples 108 after radiation of the modulated light of S wave will be signal light of mixed waves of S wave signal light and P wave signal light.

Among the mixed waves of S wave signal light and P wave signal light emitted from the samples 108, at least a part of the S wave signal light is transmitted through the Bragg grating pattern 113, while the P wave signal light is incident into light guiding part 109 to be directed to the measuring part 110 side without being transmitted through the Bragg grating pattern 113.

On the other hand, at least a part of the modulated light of S wave that has radiated the samples 108 is not reflected by the Bragg grating pattern 113 but is transmitted through the light guiding part 109.

Therefore, at least a part of the modulated light that has radiated the samples 108 is prevented from being incident into a measuring part 110 by the Bragg grating pattern 113. Accordingly, the S/N ratio is improved, whereby the measurement precision is improved.

In this embodiment, a Bragg grating pattern that transmits S wave has been described: however, a Bragg grating pattern that transmits P wave may be used as well.

Further, instead of a Bragg grating pattern, an optical film having a property of transmitting at least a part of S wave or P wave and reflecting the other one may be used as well. The optical film is generally formed of a multi-layer film; however, the optical film may be a mono-layer film.

Sixth Embodiment

Figure 7:
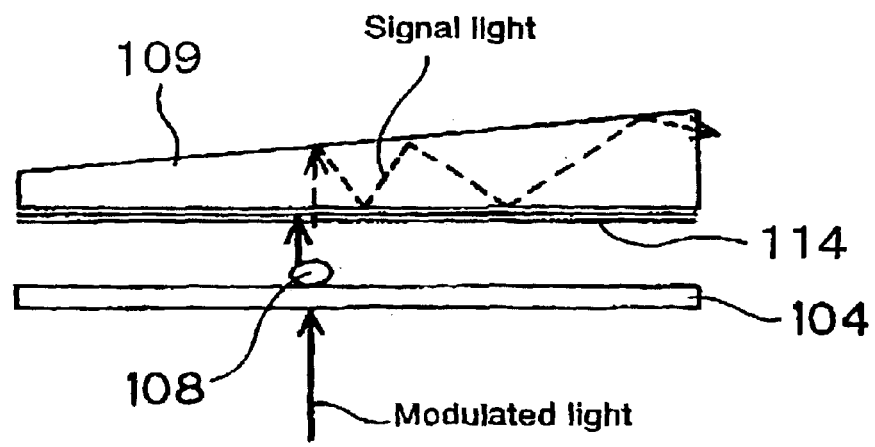
FIG. 7 shows a sixth embodiment of the present invention.

As shown in FIG. 7, an optical device according to one embodiment of the present invention includes a filter 114 provided with a light guiding part 109. The filter 114 has the function of preventing the radiation light from a light source unit 106 from being incident into the light guiding part 109. The filter 114 gives different properties depending on whether the radiation light radiated onto the samples is not polarized in a predetermined polarization state or is polarized in a predetermined polarization state.

Case Where Radiation Light is Not Polarized in Predetermined Polarization State

In this case, in order to prevent the radiation light from being incident into a light guiding part 105, the filter 114 gives a property of absorbing at least a part of the radiation light.

Therefore, the signal light emitted from samples 108 is incident into the light guiding part 105 without being absorbed by the filter 114, while at least a part of the radiation light is absorbed by the filter 114 so as not to be incident into the light guiding part 105. Therefore, decrease in the S/N ratio by the radiation light can be prevented, whereby the measurement precision is improved.

Case Where Radiation Light is Polarized in Predetermined Polarization State

In this case, the filter 114 is formed of a polarizing plate or the like that does not transmit at least a part of the light polarized in a predetermined polarization state.

Hereinafter, description will be given of a case where the filter 114 is formed of a polarizing plate that does not transmit at least a part of the light of S wave.

First, light modulated into S wave is radiated onto the samples 108. The light generated from the samples 108 that have received the radiation of the modulated light of S wave will be a signal light of mixed waves of S wave signal light and P wave signal light. Among the light of mixed waves generated from the samples 108, the P wave signal light is transmitted through the filter 114 to be incident into the light guiding part 105, while at least a part of the S wave signal light is controlled from being transmitted by the filter 114 so as not to be incident into the light guiding part 105.

On the other hand, at least a part of the modulated light of S wave that has radiated the samples 108 is prevented by the filter 114 from being transmitted so as not to be incident into the light guiding part 105.

Thus, in this embodiment, the filter 114 prevents at least a part of the light that has radiated the samples 108 from being incident into the light guiding part 105 to be measured by a measuring device, so that detection can be carried out at high precision.

The filter 114 may be disposed either on a surface of the light guiding part 105 that faces the substrate or on a surface of the light guiding part 105 that faces the measuring device.

Seventh Embodiment

Figure 8:
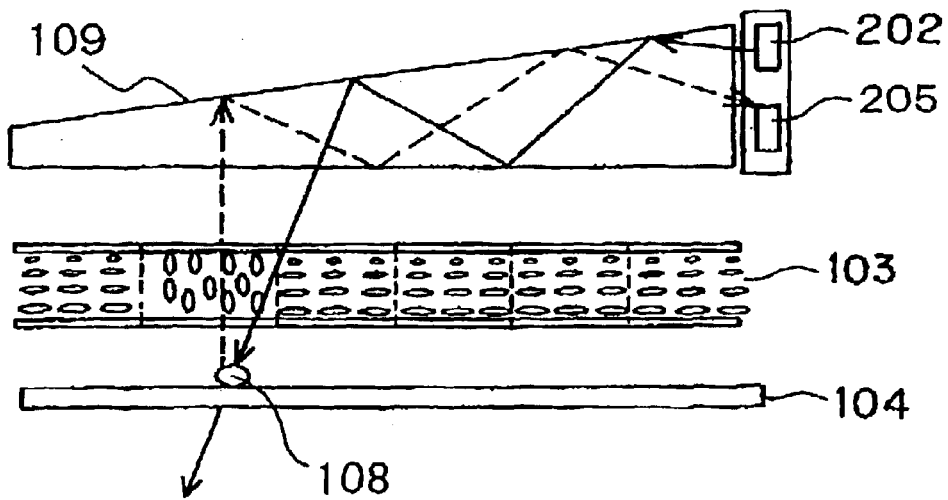
FIG. 8 shows a seventh embodiment of the present invention.

As shown in FIG. 8, an optical device according to one embodiment of the present invention includes a light guiding part 109, a liquid crystal panel 103 and a substrate 104, and these are laminated in this order. Further, a light source unit 202 and a light receiver 205 are disposed in parallel on one side surface of the light guiding part 109.

Radiation light emitted from the light source unit 202 is guided through the light guiding part 109 to be incident into the liquid crystal panel 103. By application of voltage to a desired liquid crystal cell of the liquid crystal panel 103, the radiation light is transmitted through the liquid crystal panel in a position-selective manner, and is radiated onto samples 108. Subsequently, signal light emitted from the samples 108 is transmitted through the liquid crystal panel 103 to be incident into the light guiding part 109 and is guided through the light guiding part 109 to be received by the light-receiver 205.

Thus, by using a light guiding part for guiding the radiation light from the light source to the samples and a light guiding part for guiding the signal light from the samples to the light receiving section in common, the number of components can be reduced, thereby making the device smaller and thinner in size and produced at lower cost.

Further, by disposing the light source unit 202 and the light-receiver 205 in parallel, the assembling work is facilitated, and the device as a whole is made smaller in size. In addition, according to this structure, since the propagating directions of the reference light and the signal light are different from each other, the reference light is prevented (alleviated) from being received by the light-receiver 205, so that mainly the signal light can be detected. This leads to improvement of the S/N ratio.

Eighth Embodiment

An optical device according to one embodiment of the present invention includes alignment marks for positioning of a substrate 104 and a liquid crystal panel 103.

By the presence of the alignment marks, positioning of the substrate 104 in the horizontal direction and control for assembling in the height direction are facilitated, so that the precision of placement is improved. Also, deterioration of optical performance can be prevented.

Ninth Embodiment

A method of reading a biochip according to one embodiment of the present Invention includes the steps of: radiating light from a light source unit to samples; and receiving light generated from the samples, wherein the light from the light source unit can be radiated onto a desired sample by selective application of voltage to liquid crystal cells each corresponding to each of the samples.

Thus, according to this embodiment, control of the light radiated onto the samples by the liquid crystal panel eliminates the need for mechanical scanning, so that the measurement precision is kept in time series.

The emission of light from the samples may be measured after the radiation of light from the light source unit is stopped. This can prevent (alleviate) the reference light or the modulated light radiated from the light source unit onto the samples from being measured by the measuring device, whereby the S/N ratio is improved.

The method of reading a biochip according to the present invention can be used for determination of gene sequences, confirmation of the presence or absence of a specific gene, measurement of the expression level of a specific gene, analysis of SNP (single base polymorphism), confirmation of the path or state of metabolism, absorption or excretion of a substance administered to an experimental mouse, measurement of ion concentration within a cell, identification or functional analysis of proteins, and others. In addition, the method can be applied to health diagnosis for differentiating the health state of individuals, test for individual security, and others.

The embodiments described above can be combined as long as the combination is possible.

As described above, according to the present invention, a biochip including means for scanning light eliminates the need for mechanically scanning in reading the biochip, thereby achieving downsizing, cost reduction and high-speed operation of a biochip reader.

What is claimed is:

1. A biochip comprising:
   a substrate having a plurality of samples; and
   a liquid crystal panel disposed on a side of the substrate where the samples are not provided and composed of a plurality of liquid crystal cells, wherein
   the liquid crystal panel includes an upper polarization filter, an upper transparent electrode, an upper orientation film, a liquid crystal, a lower orientation film, a lower transparent electrode, and a lower polarization filter,
   each of the samples is disposed in correspondence with each of the liquid crystal cells, and
   external light is selectively radiated onto the samples by application of voltage to the liquid crystal cells.

2. An optical device comprising:
   a biochip according to claim 1;

a light source unit for radiating light onto the biochip; and a light-receiver for receiving light generated from the samples.

3. The optical device according to claim 2, wherein the light source unit is a flat light source unit including a point light source and a light diffusing plate.

4. The optical device according to claim 2, wherein the light-receiver includes a light guiding part for guiding light and a measuring part for sensing light.

5. The optical device according to claim 4, wherein the light guiding part has a wedge shape.

6. A method of reading a biochip having a plurality of samples, comprising the steps of:

radiating light from a light source unit onto the samples; and receiving light generated from the samples, wherein light from the light source unit is radiated onto a desired sample by applying voltage selectively to liquid crystal cells corresponding to each of the samples.

* * * * *